United States Patent
Kogan

(10) Patent No.: US 9,339,934 B2
(45) Date of Patent: May 17, 2016

(54) METHOD FOR MANUALLY ADJUSTING THE POSE OF A MANIPULATOR ARM OF AN INDUSTRIAL ROBOT AND INDUSTRIAL ROBOTS

(71) Applicant: KUKA Laboratories GmbH, Augsburg (DE)

(72) Inventor: Yevgen Kogan, Augsburg (DE)

(73) Assignee: KUKA Roboter GmbH, Augsburg (DE)

(*) Notice: Subject to any disclaimer, the term of this patent is extended or adjusted under 35 U.S.C. 154(b) by 57 days.

(21) Appl. No.: 14/491,460

(22) Filed: Sep. 19, 2014

(65) Prior Publication Data

US 2015/0081098 A1    Mar. 19, 2015

(30) Foreign Application Priority Data

Sep. 19, 2013 (DE) .......... 10 2013 218 823

(51) Int. Cl.
| | |
|---|---|
| *G05B 15/00* | (2006.01) |
| *G05B 19/00* | (2006.01) |
| *B25J 13/08* | (2006.01) |
| *B25J 9/16* | (2006.01) |
| *G05B 19/423* | (2006.01) |

(52) U.S. Cl.
CPC .............. *B25J 13/085* (2013.01); *B25J 9/1656* (2013.01); *G05B 19/423* (2013.01); *G05B 2219/36432* (2013.01); *G05B 2219/39346* (2013.01); *Y10S 901/09* (2013.01); *Y10S 901/46* (2013.01)

(58) Field of Classification Search
USPC .............. 700/245, 258, 260, 262, 246; 318/2; 901/15, 16, 17, 18, 19, 27, 28, 29, 46
See application file for complete search history.

(56) References Cited

U.S. PATENT DOCUMENTS

| | | | |
|---|---|---|---|
| 6,385,508 B1 | 5/2002 | McGee et al. | |
| 6,424,885 B1 * | 7/2002 | Niemeyer | A61B 19/22 600/109 |

(Continued)

FOREIGN PATENT DOCUMENTS

| | | |
|---|---|---|
| CN | 102858490 A | 1/2013 |
| CN | 103170658 A | 6/2013 |

(Continued)

OTHER PUBLICATIONS

European Patent Office; Search Report in European Patent Application No. 14183559.5 dated Mar. 16, 2015; 7 pages.

(Continued)

*Primary Examiner* — Ronnie Mancho
(74) *Attorney, Agent, or Firm* — Wood, Herron & Evans, LLP

(57) ABSTRACT

A method for manually guided adjustment of the pose of a manipulator arm of an industrial robot includes detecting a guidance force applied to the manipulator arm by an operator of the industrial robot, determining one of at least two degrees-of-freedom of a reference coordinate system as a selected freedom direction, wherein the selected freedom direction corresponds to the degree-of-freedom in which the guidance force has its greatest force vector component, and controlling the drives of the industrial robot using force control in such a manner that a pre-specified reference point associated with the manipulator arm is moved only in the selected freedom direction as a result of movement of the manipulator arm by an operator during a manually-guided adjustment of the pose of the manipulator arm.

17 Claims, 3 Drawing Sheets

(56) References Cited

U.S. PATENT DOCUMENTS

| | | | | |
|---|---|---|---|---|
| 8,010,180 B2* | 8/2011 | Quaid | ............... | A61B 17/1764 600/424 |
| 8,012,107 B2* | 9/2011 | Einav | ................... | A61B 5/7475 601/5 |
| 8,177,732 B2* | 5/2012 | Einav | ................... | A61H 1/0274 601/23 |
| 8,287,522 B2* | 10/2012 | Moses | ............... | A61B 19/5244 128/898 |
| 8,545,420 B2* | 10/2013 | Einav | ................... | A61H 1/0237 601/24 |
| 8,864,655 B2* | 10/2014 | Ramamurthy | ........... | A61B 5/06 600/117 |
| 2011/0190932 A1 | 8/2011 | Tsusaka et al. | | |
| 2015/0081098 A1* | 3/2015 | Kogan | ................... | B25J 9/1656 700/258 |

FOREIGN PATENT DOCUMENTS

| | | |
|---|---|---|
| CN | 103209810 A | 7/2013 |
| DE | 102008027008 A1 | 12/2009 |
| DE | 102008062622 A1 | 6/2010 |
| EP | 0850730 A1 | 7/1998 |
| EP | 2131257 A1 | 12/2009 |
| JP | 4759660 B2 | 8/2011 |
| WO | 2009106983 A1 | 9/2009 |
| WO | 2010088959 A1 | 8/2010 |

OTHER PUBLICATIONS

Chinese Patent Office; Office Action in Chinese Patent Application No. 201410484179.2 dated Sep. 28, 2015; 18 pages.

German Patent Office; Search Report in German Patent Application No. 10 2013 218 823.4 dated Aug. 5, 2014; 10 pages.

Korean Patent Office; Office Action in Korean Patent Application No. 2014-0124307 dated Jan. 27, 2016; 5 pages.

* cited by examiner

METHOD FOR MANUALLY ADJUSTING THE POSE OF A MANIPULATOR ARM OF AN INDUSTRIAL ROBOT AND INDUSTRIAL ROBOTS

TECHNICAL FIELD

The invention relates to a method for the manually guided adjustment of the pose of a manipulator arm of an industrial robot, and to an industrial robot comprising a robot control which is designed and/or configured to carry out such a method.

BACKGROUND

A method is known from DE 10 2008 062 622 A1 for inputting commands into a control device of a manipulator, particularly of a robot, having the steps: detecting a first force which acts on the manipulator in a first direction; comparing the detected first force to saved forces, wherein one command is functionally assigned to each of the same; and outputting the command functionally assigned to this saved force to the control of the manipulator if the detected first force agrees with a saved force. The manipulator in this case preferably has a compliant design, meaning that it is able to move in a recognizable manner as a result of the forces exerted on it manually upon a command input by the operator. This can be realized by a pure proportional position control with correspondingly small proportionality constants. Likewise, such a resilient manipulator can also be force controlled, but also can particularly be placed in a rigid position control as well. For this purpose, it is possible to calculate the forces—by way of example in a control device using a mathematical substitution model—which exactly compensate weight- and friction forces in the given position of the manipulator. If these forces are connected to the force control of the motors of the manipulator arm as target values, the manipulator arm can be moved from its position using relatively small forces. A further option for making a manipulator compliant—meaning recognizably moveable in response to the forces exerted on it as a result of the command input, is that of detecting the forces exerted on it and [the manipulator arm] reacting to these forces with a corresponding movement in the direction of these forces and, preferably, with a movement speed which corresponds to the magnitude of the forces. In such a compliant manipulator arm, the forces exerted on it as a result of the command input therefore lead to a measurable movement of the manipulator arm, which is preferably recognizable by the operator as well, precisely in the direction which is specified by an operator of the manipulator arm by means of the manual guidance.

SUMMARY

The problem addressed by the invention is that of improving a method for the manually guided adjustment of the pose of a manipulator arm of an industrial robot, particularly to simplify the manipulation and/or programming of the industrial robot by an operator.

This problem addressed by the invention is solved by a method for the manually guided adjustment of the pose of a manipulator arm of an industrial robot, having the steps:
  detection of a guidance force applied to the manipulator arm by an operator of the industrial robot,
  determination of the direction of freedom in a reference coordinate system in which the guidance force has its greatest force vector component, as a selected freedom,
  force controlled control of the drives of the industrial robot in such a manner that a pre-specified reference point connected to the manipulator arm is moved only in the selected freedom, as a result of movement of the manipulator arm during a manually-guided adjustment of the pose of the manipulator arm.

Manipulator arms with associated robot controls, particularly industrial robots, are work machines which can be equipped for automatically manipulating and/or processing objects using tools, and can be programmed in multiple axes of movement—for example for orientation, position, and work process. Industrial robots typically have a manipulator arm with multiple elements connected via joints, and programmable robot controls (control devices) which automatically control the movement processes of the manipulator arm during the operation thereof. The elements are moved via drives, particularly electric drives, which are controlled by the robot control, particularly with respect to the axes of movement of the industrial robot, the same representing the degrees of freedom of movement of the joints.

Manipulator arms can comprise, by way of example, a frame and a carousel which is mounted by means of a joint in a manner allowing rotation relative to the frame, wherein a link is mounted on said carousel by means of another joint, in a manner allowing pivoting. An arm boom can in turn be mounted on the link by means of a further joint in a manner allowing rotation. The arm boom in this case carries a robot hand, and as such, the arm boom and/or the robot hand can have multiple further joints. A manipulator arm which has multiple elements connected via joints can be configured as an articulated arm robot with multiple elements and joints arranged in series one after the other. In particular, the manipulator arm can be designed as a six-axis articulated arm robot.

Manipulator arms with associated robot controls, such as industrial robots, can also be so-called lightweight robots which differ from conventional industrial robots in that they have a constructed size which is advantageous for the human/machine cooperation, and have a relatively high load capacity relative to their own weight. In addition, lightweight robots can particularly be operated with force control rather than position control, which simplifies a manual adjustment of the pose of the manipulator arm, by way of example. In addition, in this way it is possible to achieve secure human/machine cooperation, because it is possible to prevent or at least to lessen unintentional collisions of the manipulator arm with persons, by way of example, in such a manner that the persons do not receive any injury. Such a manipulator arm and/or such a lightweight robot can have more than six degrees of freedom, such that as a result an over-determined system is created. In this way, it is possible to reach the same point in space in the same orientation, in multiple different poses of the manipulator arm. The lightweight robot can react in a suitable manner to external applications of force. Force sensors can be used to measure forces, said force sensors being capable of measuring forces and torques in all three spatial dimensions. As an alternative or in addition thereto, the external forces can also be estimated without sensors—for example using the measured motor currents of the drives on the joint of the lightweight robot. By way of example, an indirect force control can be used as the control concept, based on modeling the lightweight robot as a mechanical resistance (impedance), or a direct force control can be used.

The term 'pose of the manipulator arm' very generally means the sum of all joint positions of the manipulator arm which connect the individual elements of the manipulator arm in an adjustable manner. In a more narrow sense, in a clearly determined system, the term 'pose' can also be understood to mean the position and the orientation of a reference point, by way of example, such as a tool reference point (Tool Center Point (TPC)) of the manipulator arm, for example. The tool reference point can be formed by a suitable point on a hand adapter of the manipulator arm, by way of example, wherein a grip, a tool, or another device is attached on the same in order to make it possible for the same to be moved by adjusting the pose of the manipulator arm in space. In general, the tool reference point can be a virtual point in space, which can also be outside of the manipulator arm, but which is geometrically fixed to one of the elements of the manipulator arm, particularly the hand adapter of the manipulator arm.

The term 'manually-guided movement of the pose of the manipulator arm' particularly means that the momentary joint positions of the manipulator arm are changed by an operator of the industrial robot gripping the manipulator arm at one or more of its joints and changing the pose of the manipulator arm—that is, adjusting the pose—by pressing, pulling, and/or rotating the gripped element or the gripped elements, by way of example. In one fundamental embodiment, a grip can be rigidly attached, by way of example—or at least a grip segment can be configured—on the element of the manipulator arm which is last in the kinematic chain—that is, on the hand adapter of the manipulator arm, wherein a guidance force can be directed into the mechanical structure of the manipulator arm via the same. Such a guidance force applied to the manipulator arm by the operator of the industrial robot can be directly measured by sensors which are specially designed and constructed for this purpose, by way of example—particularly force sensors—or can be indirectly calculated from measured values of joint sensors which are already present—particularly force/torque sensors of the manipulator arm, or can be indirectly determined from motor currents of the drive of the joint of the industrial robot.

A reference coordinate system can be, by way of example, a world coordinate system of a work space of the industrial robot, a basic coordinate system in a foot of the industrial robot, or a tool coordinate system of a tool, a grip, or another device attached to the industrial robot which is supposed to be moved by the adjustment of the pose of the manipulator arm in space. The reference coordinate system to be specified can particularly be the three-dimensional Cartesian coordinate system with six degrees of freedom. As an alternative, the reference coordinate system can also be any other arbitrary coordinate system. As such, it can be more practical in certain applications to use a polar coordinate system, a cylindrical coordinate system, or a spherical coordinate system, by way of example. However, any other arbitrary coordinate system can also be specified by an individual pre-specification by the operator of the industrial robot. In particular, the individual coordinate system can be defined by "teaching" points and/or lines by means of the industrial robot itself.

The 'freedoms' are meant to include, by way of example, the three spatial directions which are perpendicular to each other—in the case of a three-dimensional Cartesian coordinate system, as well as the three basic rotations about these three spatial directions which are perpendicular to each other in space. In the case of another reference coordinate system, the freedoms are formed by the types of 'coordinate axes' corresponding to the specific reference coordinate system.

In the method according to the invention, there is first a detecting of a guidance force applied to the manipulator arm by the operator of the industrial robot—that is, by means of sensors, particularly force sensors, the guidance force is measured directly, or is calculated from measured values of joint sensors which are already present—particularly force/torque sensors of the manipulator arm, or optionally the guidance force is determined indirectly from motor currents of the drive of the joints of the industrial robot in order to make it possible to determine a pressing, pulling, and/or rotation of the gripped element or multiple gripped elements of the manipulator arm, exerted on the manipulator arm by the operator, by way of example, with respect to the guidance force directed into the structure of the manipulator arm, in turn with respect to the magnitude and direction thereof.

Then, from the magnitude and the direction of the guidance force applied by the operator, in the method according to the invention, the freedom direction of a reference coordinate system is determined in which the guidance force has its greatest force vector component. This greatest force vector component then determines the selected freedom which, for example in the case of a Cartesian coordinate system, can be one of the three Cartesian directions in space, or one of the three rotations about the respective Cartesian spatial direction. In one special embodiment of a method according to the invention, in the case of the Cartesian coordinate system, two freedoms, particularly two spatial directions, can be selected simultaneously. As a result, a plane is actually selected, within which the specified reference point is then able to move—however, exclusively in this plane.

This greatest force vector component can be determined, by way of example, by the detected force being projected mathematically onto all freedoms of the reference coordinate system in the form of vectors, and the specific freedom of the reference coordinate system in which the magnitude of the projected force is the greatest being determined as a selected freedom from all of the projected forces of the at least two freedoms of the reference coordinate system.

To detect a guidance force applied by an operator of the industrial robot to the manipulator arm, the industrial robot need not necessarily be in a control—that is, be force controlled, and particularly be controlled with an impedance control or admittance control. Rather, separate force—and/or torque sensors can be included on the manipulator arm, by way of example, which measure the guidance force applied by an operator of the industrial robot to the manipulator arm, by way of example. In this way, it is also possible for the guidance force to be determined, by way of example, if the joints of the manipulator arm are rigid—particularly if brakes fix the joints of the manipulator arm—that is, have made the same blocked and/or immobile. In another embodiment, the guidance force can be detected in a force controlled configuration of the industrial robot.

Completing and continuing the method according to the invention, a force controlled control of the drives of the industrial robot is performed in such a manner that a pre-specified reference point connected—and particularly geometrically or structurally connected—to the manipulator arm is moved only in the selected freedom, as a result of movement of the manipulator arm during a manually-guided adjustment of the pose of the manipulator arm. This means that an operator can only move the manipulator arm in such a manner that the reference point can only move along the selected freedom. In the case of a Cartesian coordinate system being used as the reference coordinate system, this can mean that the reference point can only be raised and/or lowered in space along a vertical line, by way of example, and cannot be pushed in a horizontal plane. In this case, no manner of rotation of the reference point would be possible. This manner of limited mobility would then be controlled according to the method if the operator has moved the hand adapter of the manipulator arm, by way of example, at least substantially upward or downward. Irrelevant movements sideways—that is, in a horizontal plane—would be possible because the manipulator arm is initially in a general control status which is not within the method of the invention.

However, according to the last method step, once the drives of the industrial robot are then controlled by force control in such a manner that an adjustment of the pre-specified reference point by means of movement of the manipulator arm during a manually-guided adjustment of the pose of the manipulator arm only occurs in the selected freedom, the operator can then only move the hand adapter of the manipulator arm upward or downward, by way of example. As such, an approach movement of a tool carried by the manipulator arm, by way of example, can be performed exactly perpendicular to a horizontally-oriented component, although the manipulator arm is merely guided by hand, and is neither controlled by a program nor moved automatically by the actuation of operating buttons.

In such a movement mode which is restricted to one selected freedom, the method according to the invention can be once more used.

In one embodiment variant, prior to the detection of a guidance force, drives of the industrial robot which are designed and constructed for the purpose of automatically adjusting the pose of the manipulator arm can be controlled by a force-control.

In general, the method according to the invention can be carried out with the following steps—particularly for the first time or in a repeated application:
    pre-specification of a reference coordinate system with at least two degrees of freedoms freedom.
    pre-specification of a reference point connected to the manipulator arm,
    force controlled control of drives of the industrial robot which are designed and constructed for the purpose of automatically adjusting the pose of the manipulator arm, and
    detection of a guidance force applied to the manipulator arm by an operator of the industrial robot,
    determination of the direction of freedom in a reference coordinate system in which the guidance force has its greatest force vector component, as a selected freedom,
    force controlled control of the drives of the industrial robot in such a manner that a pre-specified reference point is moved only in the selected freedom, as a result of movement of the manipulator arm during a manually-guided adjustment of the pose of the manipulator arm.

Once a reference coordinate system has been pre-specified, with at least two freedoms and one reference point—for example during an initialization of the robot control, by a selection in a menu of a robot control software program, by way of example, or by pre-specification by means of a robot program—the industrial robot is controlled with a force control by drives of the industrial robot which are designed and constructed for the purpose of automatically adjusting the pose of the manipulator arm being controlled by a force-control.

The industrial robot in this case can initially be brought into an unrestricted force controlled control status, by way of example, such that the method according to the invention can be once more carried out from the start of the method. As an alternative, another freedom can be selected directly from a movement mode which is restricted according to the invention, and then the other freedom can be set as the selected freedom.

As such, during a mobility of the pre-specified reference point in only one vertical direction, by way of example, the operator can apply a significantly great force in the horizontal direction which can exceed a pre-specified minimum force, in such a manner that this new freedom in the horizontal plane is set as the new selected freedom. This means that the pre-specified reference point can initially only be moved vertically, but then the pre-specified reference point can be moved exclusively in a horizontal direction after a clear jerk, by way of example, by the user in this horizontal direction, and then can no longer be moved vertically.

In order to make this possible, the freedom direction in the reference coordinate system in which the guidance force has its greatest force vector component can be determined as a selected freedom once the detected guidance force exceeds a pre-specified minimum force.

As an alternative or in addition thereto, the force controlled control of the drives of the industrial robot can be performed in such a manner that a pre-specified reference point is moved only in the selected freedom, as a result of movement of the manipulator arm during a manually-guided adjustment of the pose of the manipulator arm, once the detected guidance force applied to the manipulator arm by the operator of the industrial robot exceeds a pre-specified minimum force.

In both cases, the pre-specified minimum force constitutes a force threshold which must first be overcome for the other freedom to start to be used as the newly selected freedom. As such, the minimum force being exceeded constitutes a trigger which results in the setting and/or switching of the selected freedom. As such, the pre-specified reference point can continue to be moved in the selected freedom with little application of force, without the restricted guidance in the direction of this selected freedom being lost. This means that the operator can certainly apply a certain force to the manipulator arm in the direction of the unpermitted, non-selected freedom, but this does not lead to a resetting of the manipulator arm in this unpermitted, non-selected freedom. Only when the pre-specified minimum force is overcome by the operator—for example by a jerky pull in an unpermitted, non-selected freedom—does the selected freedom jump, so to speak, to this new freedom and/or direction, such that the pre-specified reference point can then only be moved in this new direction. A movement of the pre-specified reference point in the freedom selected up to this point is then no longer possible in such an embodiment of the method.

As an alternative to a triggering of the setting and/or changing of the selected freedom by means of the minimum force being exceeded, a trigger can also be an actuating button, for example on the structure of the manipulator arm, on a grip connected to the manipulator arm, or on a programming hand device, wherein the actuation thereof causes the setting and/or changing of the selected freedom by the robot control.

In a further alternative, a triggering of the setting and/or changing of the selected freedom and/or a switching of the selected freedom can occur as a result of a minimum time duration of a force acting in a direction, which is the current movement direction. This can mean that, by way of example, when the operator applies a force, by way of example, orthogonal to the current movement direction, and particularly a relatively small force, but nevertheless maintains this force over a certain period of time in the same direction, the movement direction—meaning the degree of freedom, is switched.

The determination of the freedom direction in the reference coordinate system in which the guidance force has its greatest force vector component, as a selected freedom, can only be carried out and/or possible in one variant of the method if the detected guidance force applied to the manipulator arm by the operator of the industrial robot, and applied particularly by the hand of the operator, exceeds a pre-specified minimum force.

The force controlled control of the drives of the industrial robot in such a manner that a pre-specified reference point is moved only in the selected freedom, as a result of movement of the manipulator arm during a manually-guided adjustment of the pose of the manipulator arm can, in another variant of the method, only be carried out and/or possible once the detected guidance force applied to the manipulator arm by the operator of the industrial robot, and applied particularly by the hand of the operator, exceeds a pre-specified minimum force.

In all corresponding embodiments, a rigidity of the force controlled industrial robot parameterized prior to the pre-specified minimum force being reached can be reduced during the application of the guidance force once the pre-specified minimum force has been reached and/or exceeded. In all other, non-selected freedoms, the originally parameterized rigidity remains unaltered. In one basic function, the robot control is set up to control the drives of the industrial robot by force control in such a manner that initially all freedoms in the Cartesian coordinate system of the real space—for example the three spatial directions X, Y, Z, as well as the three rotations A, B, C about these spatial directions X, Y, Z, demonstrate high rigidity. This means, put differently, that the pre-specified reference point—for example the tool reference point (TCP) of the manipulator arm—can initially, in the basic function, not be manually moved at all, or can only be moved unnoticeably, from its current position and orientation. As such, a high rigidity can border on complete rigidity, such that immobility in the "direction" of all freedoms which can be perceived by the operator is in force.

Only once the operator applies a guidance force to the manipulator arm which exceeds a pre-specified minimum force is the high rigidity of the basic function no longer maintained for all freedoms. Rather, it is significantly, perceptibly reduced in the specific freedom, such that the operator can move—meaning adjust—the pre-specified reference point by adjusting the manipulator arm along the selected freedom, with little or only moderate manual application of force.

A transition from the high rigidity to the reduced rigidity in the selected freedom can occur in a jump and/or nearly in a jump. However, in a more user-friendly design, such a sudden loosening can be prevented by the rigidity in the selected freedom being changed gradually over a period of time from the high rigidity to the reduced rigidity. As such, it is possible to realize a gentle loosening of the manipulator arm in the selected freedom.

For this purpose, the rigidity of the force controlled industrial robot can be reduced gradually, particularly within 0.1 to 2.0 seconds. With a gradual reduction of the rigidity from the high rigidity to the reduced rigidity inside such a period of time, the operator is given a sufficient reaction time to perceive the change in rigidity and react to the same accordingly. This can prevent the operator from jerking the manipulator arm along the selected freedom as a result of a sudden application of a high guidance force which is supposed to overcome the pre-specified minimum force and in fact overcomes the same, where the reduction of the rigidity would otherwise be sudden.

If the rigidity is reduced gradually over a period of time from 0.1 to 2.0 seconds, and particularly linearly, this approximately corresponds to an average reaction time of an operator to be able to consciously perceive the reduction in the rigidity. The period of time over which a gradual reduction is supposed to occur can generally be set and/or be selected in advance in the robot control, particularly within a period of time of 0.1 to 2.0 seconds.

One alternative or additional possibility of preventing an undesired, sudden loosening it that of setting up the robot control in such a manner that a rigidity which is originally parameterized prior to the pre-specified minimum force being reached is maintained during the application of the guidance force, and is particularly also further maintained if the pre-specified minimum force has already been exceeded, and the rigidity is only then reduced if the guidance force is initially once more reduced, and particularly set to zero, after the pre-specified minimum force has been reached and/or exceeded.

This means that an operator initially pushes or pulls the manipulator arm in a desired direction to be releases, until his guidance force exceeds the pre-specified minimum force. Then, this freedom selected as a result is not directly released—meaning that the rigidity is significantly reduced in the direction of this freedom. Rather, the high rigidity is maintained if the pushing or pulling is continued uninterrupted. Only if the operator removes his guidance force or at least significantly reduces the same—meaning stops the further pushing or pulling—is the selected freedom released—meaning that a rigidity in the direction of the selected freedom is reduced—and the operator can then move the manipulator arm within the selected, released freedom by again applying his guidance force, which at this point no longer needs to exceed the pre-specified minimum force, and rather can be significantly below the same.

In all embodiments, the force control of the drives of the industrial robot can be implemented by means of impedance control or admittance control.

The control device can be set up such that the compliance of the manipulator arm is generated by means of impedance control.

An impedance control, in contrast to an admittance control, is based on a torque control present at the level of the joint. The deviation of the actual position from a defined target position is measured, and a desired, generalized force, and/or forces and torques, is/are determined according to the desired dynamic behavior. This force can be reproduced as corresponding joint torques via the known kinematics of the manipulator arm. The torques can then be set via the subordinate torque control.

However, the control device can be set up such that the compliance of the manipulator arm is generated by means of admittance control.

An admittance control is based on a position control of the manipulator arm present at the level of the joint. In this case, the generalized forces acting externally on the manipulator arm must be measured. Proceeding from these forces, a movement of the manipulator arm which corresponds to the desired dynamic behavior is determined, and is given to the manipulator arm as a command via an inverse kinematics and the subordinate position control.

A desired Cartesian behavior can be achieved, by way of example, based on a subordinate position-torque- or joint impedance control. These controls can be realized by the integration of torque sensors into the joints of an industrial robot. The sensor in this case detects the one-dimensional torque acting on the output of a joint. This value can be utilized as a measured value for the control, and therefore enables the elasticity of the joints to be taken into account as part of the control. In particular, in contrast to a configuration using a torque movement sensor on an endeffector of the manipulator arm, when a rotary torque sensor is used, the forces are also measured which are not exerted on the endeffector, but rather are exerted on the elements of the manipulator arm and/or particularly on a workpiece held by the manipulator arm.

The guidance force applied to the manipulator arm by the operator of the industrial robot can be detected—and particularly measured and/or calculated—with respect to the pre-specified reference point of the manipulator arm. As such, the operator need not necessarily apply the guidance force precisely to the pre-specified reference point, and rather can apply the guidance force to any arbitrary point of the manipulator arm. This is because all freedoms are initially parameterized with a high starting rigidity, and therefore the entire manipulator arm with all its elements initially demonstrates at least nearly, or completely, the behavior of a rigid body. As such, the applied guidance force need not be measured directly at the pre-specified reference point. Rather, it can be determined, and particularly calculated, by force—and/or torque measurements at other positions, particularly the joints of the manipulator arm.

In one special embodiment of a method according to the invention, the industrial robot can initially be in a force controlled mode in which an adjustment of the pre-specified reference point of the manipulator arm is only possible in the selected freedom during the manually-guided adjustment of the pose of the manipulator arm, and when the force vector component of the guidance force applied by the operator of the industrial robot to the manipulator arm in the direction of one of the other, non-selected freedoms exceeds the pre-specified minimum force, this other freedom is utilized as the new selected freedom.

In this way, it is possible to directly switch from one released, selected freedom to another freedom as the selected freedom.

By way of example, during a mobility of the pre-specified reference point in only one vertical direction, the operator can apply a significantly great force in the horizontal direction which can exceed a pre-specified minimum force, in such a manner that this new freedom in the horizontal plane is set as the new selected freedom. This means that the pre-specified reference point can initially only be moved vertically, but then the pre-specified reference point can be moved exclusively in this horizontal direction after a clear jerk, by way of example, by the user in this horizontal direction, and then can no longer be moved vertically.

In all embodiments, a triggering of the setting and/or a triggering of the changing of the selected freedom, particularly a switching of the selected freedom, takes pace based on a minimum time duration of a force applied in a direction, which is particularly the momentary movement direction.

In all embodiments, in addition, the reference coordinate system can be the three-dimensional Cartesian coordinate system with six freedoms, particularly a world coordinate system of a workspace of the industrial robot, a basic coordinate system in a foot of the industrial robot, or a tool coordinate system of a tool attached to the industrial robot.

The reference coordinate system to be pre-specified can be, by way of example, a world coordinate system of a work space of the industrial robot, a basic coordinate system in a foot of the industrial robot, or a tool coordinate system of a tool, a grip, or another device attached to the industrial robot which is supposed to be moved by the adjustment of the pose of the manipulator arm in space. The reference coordinate system to be specified can particularly be the three-dimensional Cartesian coordinate system with six degrees of freedom. As an alternative, the reference coordinate system can also be any other arbitrary coordinate system. As such, it can be more practical in certain applications to use a polar coordinate system, a cylindrical coordinate system, or a spherical coordinate system.

The problem addressed by the invention is also solved by, in addition to the method according to the invention, an industrial robot having a robot control which is designed and/or constructed for the purpose of carrying out a robot program, and also having a manipulator arm with at least three joints which can be automated according to the robot program and/or can be automatically moved in a hand-guided operation mode, wherein the robot control is designed and/or constructed to carry out a method as described.

A concrete embodiment of an industrial robot which can be operated according to the method according to the invention is explained in greater detail in the following description with reference to the attached figures. Concrete features of this embodiment can constitute general features of the invention, regardless of the concrete context in which they are mentioned—and optionally individually or in combination.

BRIEF DESCRIPTION OF THE DRAWINGS

In the figures.

DETAILED DESCRIPTION

Figure 1:
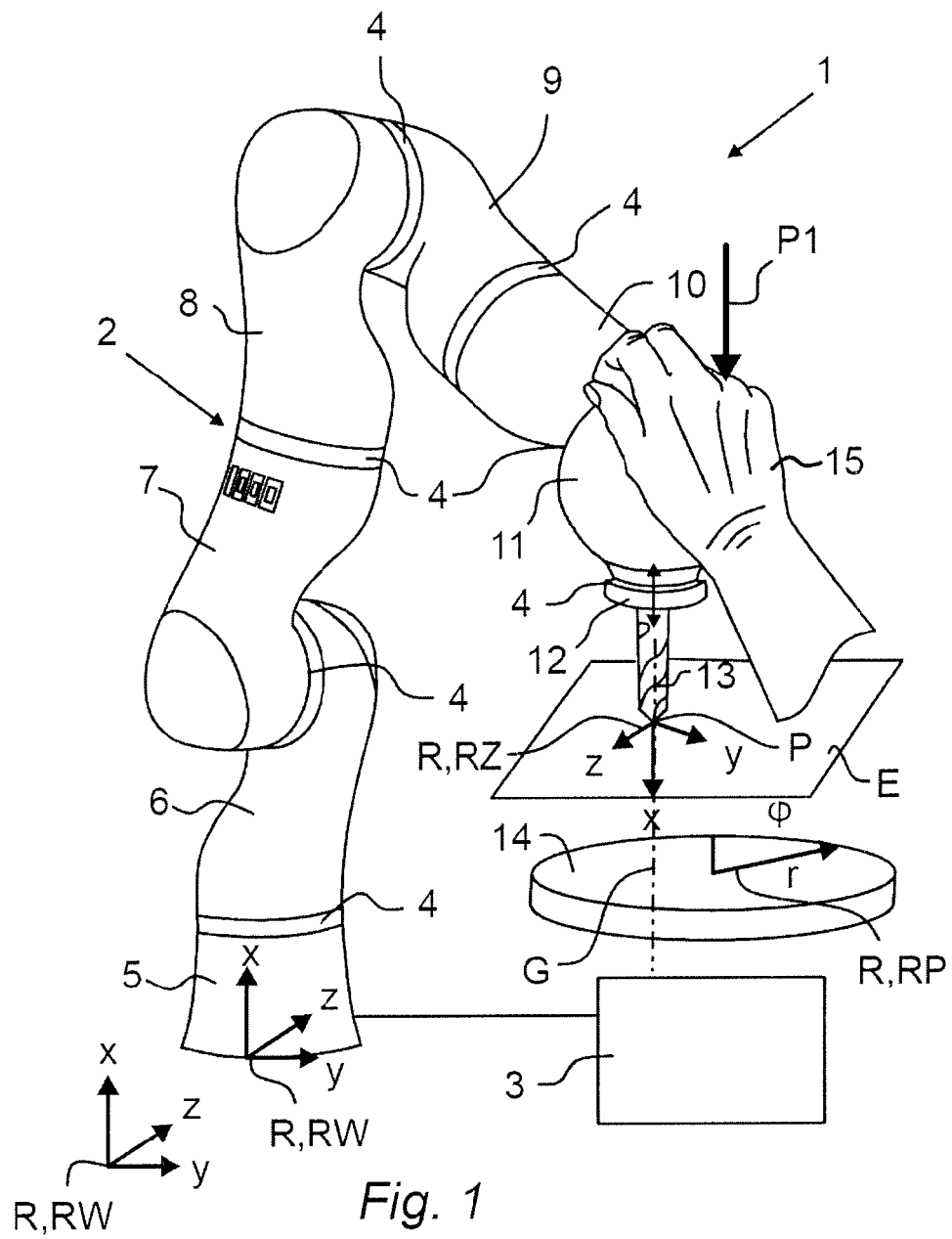
FIG. 1 shows a perspective view of an industrial robot with a lightweight robot construction, having a schematically illustrated robot control and a manipulator arm, the pose of which can only be moved vertically by means of electrical drives.

FIG. 1 shows an industrial robot 1 in an exemplary embodiment as a so-called lightweight robot, having a manipulator arm 2 and a robot control 3. The manipulator arm 2 has, in the case of the present embodiment, multiple elements 5 to 12 which are arranged one after another and connected to each other by means of joints 4 in a manner allowing rotation.

The robot control 3 of the industrial robot 1 is designed and/or constructed to carry out a robot program, by means of which the joints 4 of the manipulator arm 2 can be automated according to the robot program, or can be automatically moved and/or rotated in a hand guided operation mode. For this purpose, the robot control 3 is connected to controllable electric drives which are designed to move the joints 4 of the industrial robot 1.

The robot control 3 is designed and/or constructed to carry out a method for the manually guided adjustment of the pose of the manipulator arm 2, as described in detail below using a concrete embodiment.

In a first method step S1, the manipulator arm 2 illustrated in FIG. 1 is given the specification of one of multiple possible reference coordinate systems R.

In the case of the present embodiment, these are reference coordinate systems R in the form of three-dimensional Cartesian coordinate systems each having six freedoms, particularly a world coordinate system RW of a workspace of the industrial robot 1, a basic coordinate system RB in an element 5 of the industrial robot 1 which forms a foot of the industrial robot 1, or a tool coordinate system RZ of a tool 13 attached to the industrial robot 1.

Alternatively, the reference coordinate systems R can be, by way of example, a polar coordinate system RP which is rendered practical by a workpiece 14.

Next, in a second method step S2, a reference point P which is connected to the manipulator arm 2 is pre-specified. In the case of the present invention, this is the tool tip of the tool 13.

In the third method step S3, the drives of the industrial robot, which are designed and constructed for the purpose of automatically adjusting the pose of the manipulator arm, are force controlled.

Next, in a fourth method step S4, a guidance force applied to the manipulator arm by a hand 15 of an operator of the industrial robot 1 is detected.

In the fifth method step S5, the direction of freedom in a reference coordinate system R, RZ in which the guidance force has its greatest force vector component is determined. This then constitutes the selected freedom.

Next, in the sixth method step S6, the drives of the industrial robot 1 can be force controlled in such a manner that a pre-specified reference point P is moved by the hand 15 only in the selected freedom, as a result of movement of the manipulator arm 2 during a manually-guided adjustment of the pose of the manipulator arm 2.

The determination of the freedom direction in the reference coordinate system R, RZ in which the guidance force has its greatest force vector component, as a selected freedom, is only carried out, in the case of one variant of the present embodiment, if the detected guidance force applied to the manipulator arm 2 by a hand 15 of an operator of the industrial robot 1 exceeds a pre-specified minimum force.

The force controlled control of the drives of the industrial robot 1 in such a manner that a pre-specified reference point P is moved only in the selected freedom, as a result of movement of the manipulator arm 2 during a manually-guided adjustment of the pose of the manipulator arm 2 is, in another variant of the present embodiment, only carried out and/or possible once the detected guidance force applied to the manipulator arm 2 by a hand 15 of an operator of the industrial robot 1 exceeds a pre-specified minimum force.

This means that an operator, for example following a strong or sudden pushing by means of his hand 15 in the direction of arrow P1, downward, at this point can only move the manipulator arm 2 in such a manner that the reference point P can only move along the selected freedom, particularly in the direction of the X axis of the coordinate system RZ. In the case of a Cartesian coordinate system RZ being used as the reference coordinate system R, this can mean that the reference point P in the present embodiment can only be raised and/or lowered in space along a vertical line G, and cannot be pushed in a horizontal plane E. In this case, no manner of rotation of the reference point P would be possible. This manner of limited mobility is then controlled according to the method if the operator has moved element 11 of the manipulator arm 2, by way of example, at least substantially upward or downward. Irrelevant movements to the side—that is in the horizontal plane E—would initially be possible because the manipulator arm 2 is only in a general control mode at the start which is not embodied according to the invention. However, according to the last method step S6, once the drives of the industrial robot 1 are then controlled by force control in such a manner that an adjustment of the pre-specified reference point P by means of movement of the manipulator arm 2 during a manually-guided adjustment of the pose of the manipulator arm 2 can only occur in the selected freedom, the operator can then only move the element 11 of the manipulator arm 2, by way of example upward or downward. As such, an approach movement of a tool 13 carried by the manipulator arm 2, by way of example, can be performed exactly perpendicular to a horizontally-oriented component 14, by way of example, although the manipulator arm 2 is merely guided by hand, and is neither controlled by a program nor moved automatically by the actuation of operating buttons.

In such a movement mode which is restricted to one selected freedom, particularly according to FIG. 1 in the direction of the x-axis of the coordinate system RZ, the method according to the invention can be once again used. The industrial robot 1 in this case can initially be brought into an unrestricted force controlled control status, such that the method according to the invention can be once more carried out from the start of the method, or another freedom can be selected directly from the restricted movement mode according to FIG. 1, and then the other freedom can be set as the selected freedom.

Figure 2:
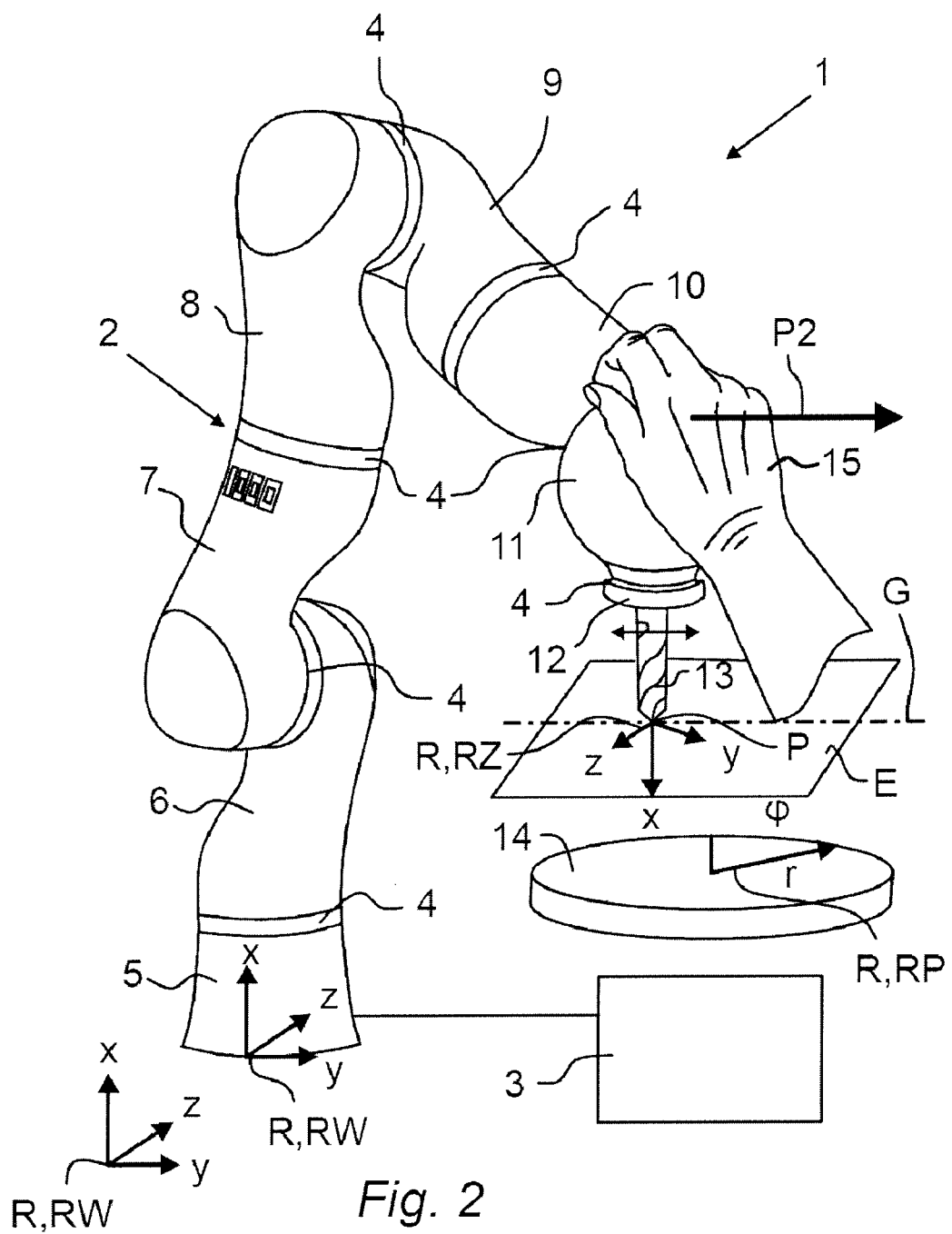
FIG. 2 shows a perspective view of the industrial robot with a lightweight robot construction, having a schematically illustrated robot control and a manipulator arm according to FIG. 1, the pose of which can only be moved horizontally by means of electrical drives.
Figure 3:
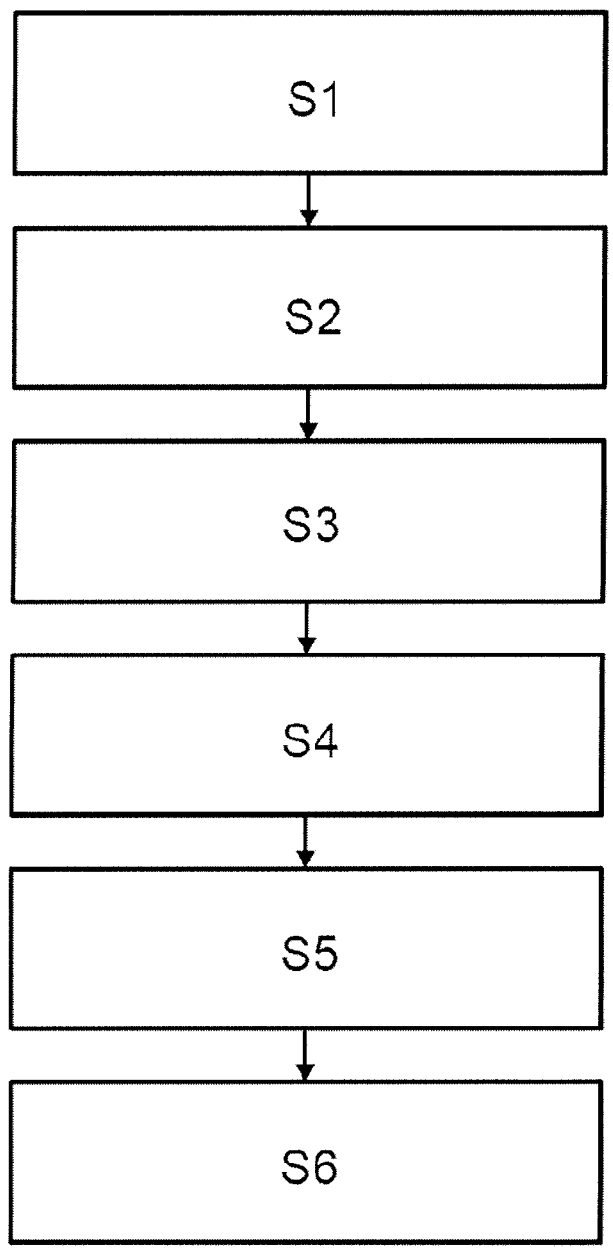
FIG. 3 shows a schematic process diagram of a method according to the invention, having the method steps S1 to S6.

As such, as shown schematically for example in FIG. 2, during a mobility of the pre-specified reference point P in only one vertical direction, the operator can apply a significantly great force by means of his hand 15, in the horizontal direction, which can exceed a pre-specified minimum force, in such a manner that this new freedom in the horizontal plane E is set as the new selected freedom. This means that the pre-specified reference point P can initially, according to FIG. 1, only be moved vertically. But, for example following a clear jerk by the hand 15 of the operator in the direction of arrow P2, in a horizontal direction, the pre-specified reference point [P] can then be moved exclusively in this horizontal direction—that is, either in the direction of the y-axis of the coordinate system RZ or in the direction of the z-axis of the coordinate system RZ, and no longer vertically in the direction of the x-axis of the coordinate system RZ.

What is claimed is:

1. A method for manually guided adjustment of the pose of a manipulator arm of an industrial robot, the method comprising:
   detecting with a robot controller a guidance force applied to the manipulator arm by an operator of the industrial robot;
   in a reference coordinate system having at least two degrees-of-freedom, determining with the robot controller one of the at least two degrees-of-freedom as a selected freedom direction, wherein the selected freedom direction corresponds to the degree-of-freedom in which the guidance force has its greatest force vector component; and
   controlling the drives of the industrial robot with a robot controller using force control in such a manner that a pre-specified reference point associated with the manipulator arm is moved only in the selected freedom direction as a result of movement of the manipulator arm by an operator during a manually-guided adjustment of the pose of the manipulator arm.

2. The method according to claim 1, further comprising:
   controlling drives of the industrial robot, which are designed and configured to automatically adjust the pose of the manipulator arm, using force control prior to the detection of a guidance force applied to the manipulator arm by an operator of the industrial robot.

3. The method according to claim 1, wherein the determining the degree-of-freedom in the reference coordinate system in which the guidance force has its greatest force vector component is only carried out once the detected guidance force applied to the manipulator arm by an operator exceeds a pre-specified minimum force.

4. The method according to claim 1, wherein controlling the drives of the industrial robot using force control is only carried out once the detected guidance force applied to the manipulator arm by an operator exceeds a pre-specified minimum force.

5. The method according to claim 1, further comprising:
once the pre-specified minimum force has been reached and/or exceeded, and during the application of the guidance force, reducing a rigidity of the force controlled industrial robot that has been parameterized prior to the pre-specified minimum force being reached.

6. The method according to claim 5, wherein the rigidity of the force controlled industrial robot is reduced gradually.

7. The method according to claim 6, wherein the rigidity of the force controlled industrial robot is reduced within about 0.1 to 2.0 seconds.

8. The method according to claim 1, wherein a rigidity which is parameterized prior to the pre-specified minimum force being reached is maintained during the application of the guidance force, and the rigidity is only then reduced if the guidance force is once more reduced after the pre-specified minimum force has been reached and/or exceeded.

9. The method according to claim 8, wherein the rigidity set to zero if the guidance force is once more reduced after the pre-specified minimum force has been reached and/or exceeded.

10. The method according to claim 1, wherein the force control of the drives of the industrial robot is implemented by means of impedance control or admittance control.

11. The method according to claim 1, wherein detecting the guidance force applied to the manipulator arm by an operator of the industrial robot comprises detecting the guidance force with respect to the pre-specified reference point of the manipulator arm.

12. The method according to claim 11, wherein detecting the guidance force with respect to a pre-specified reference point of the manipulator arm comprises measuring or calculating the guidance force.

13. The method according to claim 1, further comprising:
initially controlling the drives of the industrial robot using force control in such a manner that the pre-specified reference point associated with the manipulator arm is moved only in the selected freedom direction as a result of movement of the manipulator arm by an operator during a manually-guided adjustment of the pose of the manipulator arm; and when the force vector component of the guidance force applied by the operator of the industrial robot to the manipulator arm in a direction that corresponds to one of the other, non-selected degrees-of-freedom exceeds the pre-specified minimum force, utilizing the other degree-of-freedom as the new selected freedom direction.

14. The method according to claim 1, further comprising:
triggering at least one of a setting or changing of the selected freedom direction based on a minimum time duration of a force applied in a direction which corresponds to a momentary movement direction of the pre-specified reference point.

15. The method according to claim 1, wherein the reference coordinate system is a three-dimensional Cartesian coordinate system with six degrees-of-freedom.

16. The method according to claim 15, wherein the reference coordinate system is one of:
a world coordinate system of a workplace of the industrial robot;
a basic coordinate system in a base of the industrial robot; or
a tool coordinate system of a tool, a grip, or another device attached to the industrial robot.

17. An industrial robot having a robot control that is designed and configured to carry out a robot program, and also having a manipulator arm with at least three joints that can be automatically moved according to the robot program and/or can be automatically moved in a hand-guided operation mode, wherein the robot control is designed and configured to:
detect a guidance force applied to the manipulator arm by an operator of the industrial robot;
determine a selected direction of motion from the available degrees of freedom in a reference coordinate system which corresponds to the direction in which the guidance force has its greatest force vector component; and
control the drives of the industrial robot using force control in such a manner that a pre-specified reference point associated with the manipulator arm is moved only in the selected freedom direction as a result of movement of the manipulator arm by an operator during a manually-guided adjustment of the pose of the manipulator arm.

* * * * *